(12) United States Patent
Stecher et al.

(10) Patent No.: US 11,401,912 B2
(45) Date of Patent: Aug. 2, 2022

(54) FLEXIBLE BALSA WOOD PANEL, A ROTOR BLADE, A WIND TURBINE AND A METHOD

(71) Applicant: Siemens Gamesa Renewable Energy, Brande (DK)

(72) Inventors: Harald Stecher, Skørping (DK); Thomas Bro Wernlund, Hjørring (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 42 days.

(21) Appl. No.: 16/249,106

(22) Filed: Jan. 16, 2019

(65) Prior Publication Data

US 2019/0226447 A1    Jul. 25, 2019

(30) Foreign Application Priority Data

Jan. 24, 2018    (EP) .................................... 18153208

(51) Int. Cl.
*F03D 1/06*        (2006.01)
*B32B 3/16*        (2006.01)

(52) U.S. Cl.
CPC .............. *F03D 1/0675* (2013.01); *B32B 3/16* (2013.01); *F05B 2230/31* (2013.01); *F05B 2280/4002* (2013.01)

(58) Field of Classification Search
CPC ................................ F03D 1/0675; B32B 3/16
See application file for complete search history.

(56) References Cited

U.S. PATENT DOCUMENTS 3,540,967 A  * 11/1970 Levine .................... B32B 27/00
                                                        156/363
4,568,585 A     2/1986 Kohn et al.
(Continued)

FOREIGN PATENT DOCUMENTS

CN        101005940 A     7/2007
CN        103899476 A     7/2014
(Continued)

OTHER PUBLICATIONS

European Search report for Application No. 18153208.6, dated Jul. 20, 2018.
(Continued)

*Primary Examiner* — Michael L Sehn
(74) *Attorney, Agent, or Firm* — Schmeiser, Olsen & Watts LLP

(57) ABSTRACT

A flexible balsa wood panel for a rotor blade of a wind turbine, including a plurality of balsa wood modules and a polymer film which is attached to a surface of each balsa wood module to connect the balsa wood modules together is provided. The flexible balsa wood panel has the following advantages. An adhesion area of the polymer film is significantly larger than that of a glass fiber mesh. This in turn reduces the risk of balsa wood modules falling off during handling the flexible balsa wood panel. A polymer film with a high melting temperature relative to a maximum blade curing temperature can be selected in order to avoid curing process induced delaminations. Furthermore, due to the polymer film attached to the first surface, a more uniform adhesion may be achieved compared to a currently used glass fiber mesh.

17 Claims, 3 Drawing Sheets

(56) References Cited

U.S. PATENT DOCUMENTS

| | | | | |
|---|---|---|---|---|
| 8,382,440 B2* | 2/2013 | Baker | ................... | F03D 1/0675 |
| | | | | 416/226 |
| 9,421,742 B2* | 8/2016 | Grove-Nielsen | ........ | H05B 3/18 |
| 2013/0195617 A1* | 8/2013 | Fong | ......................... | F03D 1/04 |
| | | | | 415/4.1 |
| 2014/0186189 A1 | 7/2014 | Stege | | |
| 2014/0341747 A1 | 11/2014 | Jacobsen et al. | | |
| 2015/0266249 A1* | 9/2015 | Booth | ................... | F03D 1/0683 |
| | | | | 416/229 R |

FOREIGN PATENT DOCUMENTS

| | | | |
|---|---|---|---|
| EP | 2402594 A1 | 1/2012 | |
| EP | 2551511 A1 | 1/2013 | |
| EP | 2607075 | 6/2013 | |
| WO | WO-2017114528 A1 * | 7/2017 | ............. B29C 70/36 |

OTHER PUBLICATIONS

Non-English Chinese Office Action for Application No. 201910068176. 3, dated Mar. 17, 2020.

* cited by examiner

FLEXIBLE BALSA WOOD PANEL, A ROTOR BLADE, A WIND TURBINE AND A METHOD

CROSS-REFERENCE TO RELATED APPLICATION

This application claims priority to EP Application No. 18153208.6, having a filing date of Jan. 24, 2018, the entire contents of which are hereby incorporated by reference.

FIELD OF TECHNOLOGY

The following relates to a flexible balsa wood panel for a rotor blade of a wind turbine, to a rotor blade with such a flexible balsa wood panel, to a wind turbine with such a flexible balsa wood panel and/or such a rotor blade and to a method for producing a flexible balsa wood panel for such a rotor blade.

BACKGROUND

Modern wind turbine rotor blades are built from fiber-reinforced plastics. A rotor blade typically comprises an airfoil having a rounded leading edge and a sharp trailing edge. The rotor blade is connected with its blade root to a hub of the wind turbine. Rotor blades of this kind can comprise wood, in particular balsa wood. Wood from Ochroma pyramidale, commonly known as the balsa tree, is very soft and light, with a coarse, open grain. The density of dry balsa wood ranges from 40-340 kg/m$^3$, with a typical density of about 160 kg/m$^3$. Since balsa wood has these outstanding properties it is often used in aircraft and wind turbine technology to produce lightweight components.

Making a balsa wood panel flexible to enable it to follow curved wind turbine blade geometries is achieved by providing a glass fiber mesh or net, in particular in the form of a so-called scrim cloth, on the balsa wood panel. The glass fiber mesh may be applied by adding a wet glue to the glass fiber mesh and then rolling it onto the balsa wood panel followed by curing the glue or by rolling on a glass fiber mesh with a thermoplastic pre-applied glue onto the balsa wood panel by application of elevated temperature. After applying the glass fiber mesh and curing the glue, the balsa wood panel is cut into modules which are connected to each other solely by means of the glass fiber mesh. The balsa wood panel is now flexible and can be adapted to a curved surface.

SUMMARY

An aspect relates to provide an improved flexible balsa wood panel for a rotor blade of a wind turbine.

Accordingly, a flexible balsa wood panel for a rotor blade of a wind turbine is provided. The flexible balsa wood panel comprises a plurality of balsa wood modules and a polymer film which is attached to a surface of each balsa wood module to connect the balsa wood modules together.

By applying the polymer film instead of a glass fiber mesh the following advantages can be achieved. An adhesion area of the polymer film is significantly larger than that of a glass fiber mesh. This in turn reduces the risk of balsa wood modules falling off during handling the flexible balsa wood panel. A polymer film with a high melting temperature relative to a maximum blade curing temperature can be selected in order to avoid curing process induced delaminations. Furthermore, due to the polymer film attached to the surface, a more uniform adhesion may be achieved compared to a currently used glass fiber mesh.

The polymer film is attached directly to the surface. "Directly" means that there is needed no additional resin to fix the polymer film to the surface. The polymer film itself can work as adhesive or glue. The balsa wood modules are connected to each other solely by means of the polymer film. In particular, the balsa wood modules have a first surface, to which the polymer film is attached, and a second surface which faces away from the polymer film. The polymer film can be named as polymer foil. The polymer film can have a thickness of a few micrometers (μm) up to a few millimeters (mm). The polymer film can be perforated or unperforated, in particular smooth. The polymer film prevents the balsa wood modules from falling apart and thus maintains the integrity of the flexible balsa wood panel.

According to an embodiment, the polymer film is unreinforced. The polymer film has no reinforcement in form of glass fibers, carbon fibers or the like. In particular, the polymer film is free of fibers or fiber-free.

According to a further embodiment, the polymer film is monolayered or multilayered. "Monolayered" means that the polymer film has only one layer. "Multilayered" means that the polymer film consists of a plurality of thin polymer sheets bonded together. In particular, these sheets can all be made of the same material or of different materials. The mechanical properties of the polymer film can thus be varied widely.

According to a further embodiment, wood fibers of the balsa wood modules are arranged perpendicular to the surface of the balsa wood modules. Each balsa wood module has a first surface, to which the polymer film is attached, and a second surface which faces away from the polymer film. In particular, the wood fibers are arranged perpendicular to both surfaces.

According to a further embodiment, the polymer film comprises an adhesive face which is attached to the surface of each balsa wood module and a non-adhesive face which faces away from the surface of each balsa wood module. The adhesive face can be provided with a pressure-sensitive adhesive (PSA, self-adhesive, self-stick adhesive). A PSA is an adhesive which forms a bond when pressure is applied to marry the adhesive with the adherend. No solvent, water, or heat is needed to activate the PSA.

According to a further embodiment, a material of which the polymer film is made of itself has adhesive properties. To bond the polymer film to the balsa wood modules, the polymer film can be at least partly molten. A polymer film with a high melting temperature relative to a maximum blade curing temperature is selected in order to avoid curing process induced delaminations.

According to a further embodiment, the balsa wood modules are arranged in a chessboard-like pattern. The chessboard-like pattern can be named as matrix-like pattern. Each balsa wood module is neighbored by four further balsa wood modules.

According to a further embodiment, the balsa wood modules are rectangular or square-shaped. In particular, the balsa wood modules are cube-shaped.

According to a further embodiment, between the balsa wood modules are arranged first cuts and second cuts, wherein the first cuts are arranged perpendicular to the second cuts. The crossed-over cuts subdivide the flexible balsa wood panel into the balsa wood modules. The cuts can be made by means of a blade or a saw. The first cuts allow bending of the flexible balsa wood panel around a width direction thereof whereas the second cuts allow bending around a length direction thereof. The width direction is arranged perpendicular to the length direction.

Furthermore, a rotor blade for a wind turbine, comprising at least one such flexible balsa wood panel is provided. However, the flexible balsa wood panel can be used in any other applications related to wind turbines.

Additionally, a wind turbine, comprising at least one such flexible balsa wood panel and/or at least one such rotor blade is provided. The wind turbine has a plurality of rotor blades. "Wind turbine" presently refers to an apparatus converting the wind's kinetic energy into rotational energy, which may again be converted to electrical energy by the apparatus.

Furthermore, a method for producing a flexible balsa wood panel for a rotor blade of a wind turbine is provided. The method comprises the steps of: a) providing a rigid balsa wood panel, b) attaching a polymer film to a surface of the rigid balsa wood panel, and c) cutting the rigid balsa wood panel into a plurality of balsa wood modules to obtain the flexible balsa wood panel.

The cutting is done by means of a blade or a saw. The cuts run perpendicular to each other to generate a chessboard-like or matrix-like pattern of the balsa wood modules. In particular, the rigid balsa wood panel is a rigid balsa wood end grain panel with wood fibers running perpendicular to the afore-mentioned surface of the rigid balsa wood panel.

According to an embodiment, in step b) the polymer film is attached to the surface of the rigid balsa wood panel by applying pressure and/or heat. Both pressure and heat can be applied. Alternatively, only pressure or only heat can be applied. In the case that only pressure is used, the polymer film can be provided with a PSA. In the case that only heat or pressure and heat is used, the polymer film can be provided with a hotmelt or can be made of a hotmelt. A polymer film with a high melting temperature relative to a maximum blade curing temperature is selected in order to avoid curing process induced delaminations.

According to a further embodiment, the pressure and/or heat is applied by means of a roller. The roller can be heated. The roller can be part of a device for producing the flexible balsa wood panel. The device also can comprise a support on which the rigid balsa wood panel is placed before applying the polymer film.

According to a further embodiment, in step b) the polymer film is attached to the surface of the rigid balsa wood panel by directly extruding the polymer film onto the surface. An extruder can be used to apply the polymer film onto the surface. The material, a thermoplastic or a hotmelt, of which the polymer film is made, is molten before application thereof onto the surface. The molten material is applied directly to the surface to form the polymer film directly on the surface. Adhesion between the polymer film and the surface can be significantly improved by means of this process. A thermoplastic, or thermosoftening plastic, is a plastic material, in particular a polymer, that becomes pliable or moldable above a specific temperature, in particular the melting temperature, and solidifies upon cooling. The melting temperature of the polymer film is the same as or higher than the maximum blade curing temperature.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with references to the following figures, wherein like designations denote like members, wherein.

In the Figures, like reference numerals designate like or functionally equivalent elements, unless otherwise indicated.

DETAILED DESCRIPTION

Figure 1:
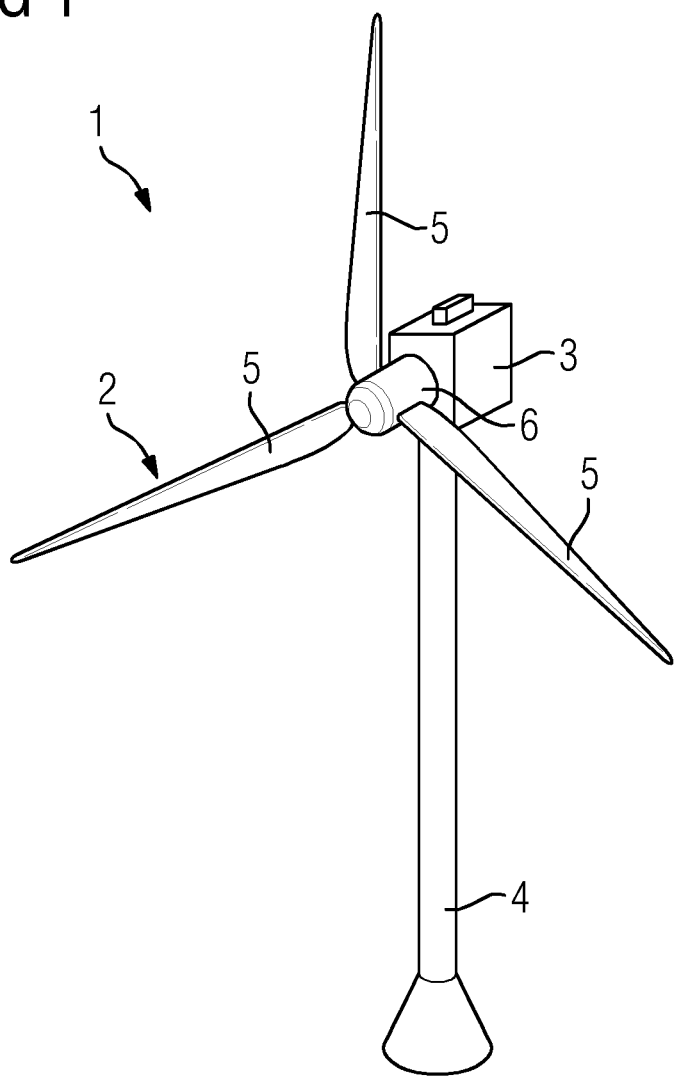
FIG. 1 is a perspective view of a wind turbine according to one embodiment.

FIG. 1 shows a wind turbine 1 according to one embodiment.

The wind turbine 1 comprises a rotor 2 connected to a generator (not shown) arranged inside a nacelle 3. The nacelle 3 is arranged at the upper end of a tower 4 of the wind turbine 1.

The rotor 2 comprises three rotor blades 5. The rotor blades 5 are connected to a hub 6 of the wind turbine 1. Rotors 2 of this kind may have diameters ranging from, for example, 30 to 160 meters or even more. The rotor blades 5 are subjected to high wind loads. At the same time, the rotor blades 5 need to be lightweight. For these reasons, rotor blades 5 in modern wind turbines 1 are manufactured from fiber-reinforced composite materials. Therein, glass fibers are generally exemplary over carbon fibers for cost reasons. Oftentimes, glass fibers in the form of unidirectional fiber mats are used.

Figure 2:
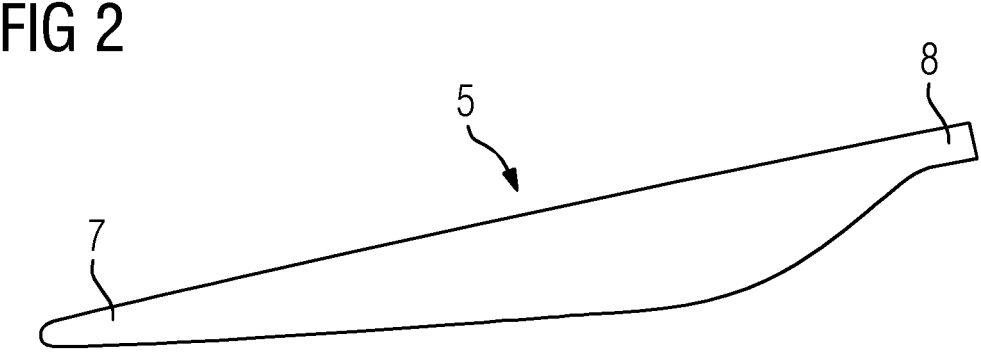
FIG. 2 is a perspective view of a wind turbine rotor blade according to one embodiment.

FIG. 2 shows a rotor blade 5 according to one embodiment.

The rotor blade 5 comprises an aerodynamically designed portion 7, which is shaped for optimum exploitation of the wind energy and a blade root 8 for connecting the rotor blade 5 to the hub 6.

Figure 3:
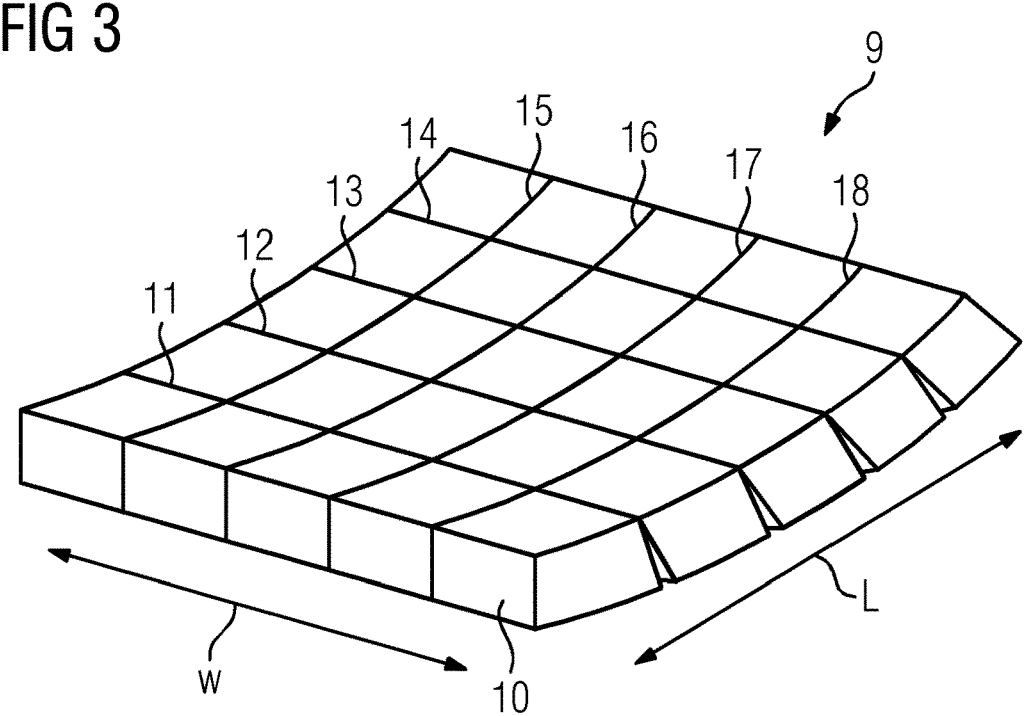
FIG. 3 shows a perspective view of a flexible wood panel according to one embodiment.

FIG. 3 shows a flexible wood panel 9 which can be used to produce rotor blades 5.

The flexible wood panel 9 can be part of a sandwich panel which is used to produce a rotor blade 5. The flexible wood panel 9 is flexible in order to enable it to follow curved geometries of the rotor blade 5. The flexible wood panel 9 is made of balsa wood which is very lightweight. The flexible wood panel 9 is produced by cutting an end grain balsa panel into rectangular modules 10 of which only one is provided with a reference sign in FIG. 3. The modules 10 can be named as balsa modules or balsa wood modules. The flexible wood panel 9 can be named flexible balsa panel or flexible balsa wood panel. The flexible wood panel 9 can have several hundred to several thousand or even many more modules 10.

To provide the modules 10, first cuts 11 to 14 are provided in the flexible wood panel 9. The number of first cuts 11 to 14 is arbitrarily. The first cuts 11 to 14 run in a width direction W of the flexible wood panel 9. The first cuts 11 to 14 are arranged parallel to each other. In the case where only the first cuts 11 to 14 are provided, the modules 10 have an elongated rectangular shape.

Optionally, there are provided second cuts 15 to 18 which run perpendicular to the first cuts 11 to 14. The second cuts 15 to 18 run in a length direction L of the flexible wood panel 9. The second cuts 15 to 18 are arranged parallel to each other. The first cuts 11 to 14 and the second cuts 15 to 18 subdivide the flexible wood panel 9 into an arbitrary number of square-shaped modules 10. The modules 10 are arranged in a matrix-like or chessboard-like pattern.

The first cuts 11 to 14 allow bending of the flexible wood panel 9 around the width direction W whereas the second cuts 15 to 18 allow bending around the length direction L. The cuts 11 to 18 are provided by cutting or sawing an end grain balsa panel. After cutting or sawing, the flexible wood panel 9 can be named grid scored panel, in particular grid scored balsa panel. In order to keep the integrity of the flexible wood panel 9 after cutting or sawing, a flexible carrier layer (not shown) which is not shown in FIG. 3 is provided before cutting. The flexible carrier layer maintains the integrity of the flexible wood panel 9 during handling in production of rotor blades 5. The flexible carrier layer is provided on an upper surface of the flexible wood panel 9 shown in FIG. 3.

Normally, the flexible carrier layer is provided in the form of a glass fiber mesh or net, in particular in form of a so-called scrim cloth. Typically, the technology for keeping the integrity of the flexible wood panel 9 is to glue the glass fiber mesh on one side of the flexible wood panel 9 before cutting it into modules 10. The glass fiber mesh can be applied by adding a wet glue to the glass fiber mesh and then rolling it onto one surface of the flexible wood panel 9 followed by curing the glue or by rolling on a glass fiber mesh with a thermoplastic pre-applied glue onto one surface of the flexible wood panel 9 by application of elevated temperature. Subsequently, the flexible wood panel 9 is cut into modules 10.

However, in some cases and/or under certain circumstances using a glass fiber mesh may result in inadequate adhesion between the glass fiber mesh and the wooden surface of the flexible wood panel 9. Furthermore, indications have been observed that relatively high process temperatures during curing the rotor blades 5 may exceed the allowable temperature of the glue used to fix the glass fiber mesh and thus can be—at least a contributing factor—for curing process induced delaminations in wind turbine glass fiber reinforced plastics blade sandwich structures.

Figure 4:
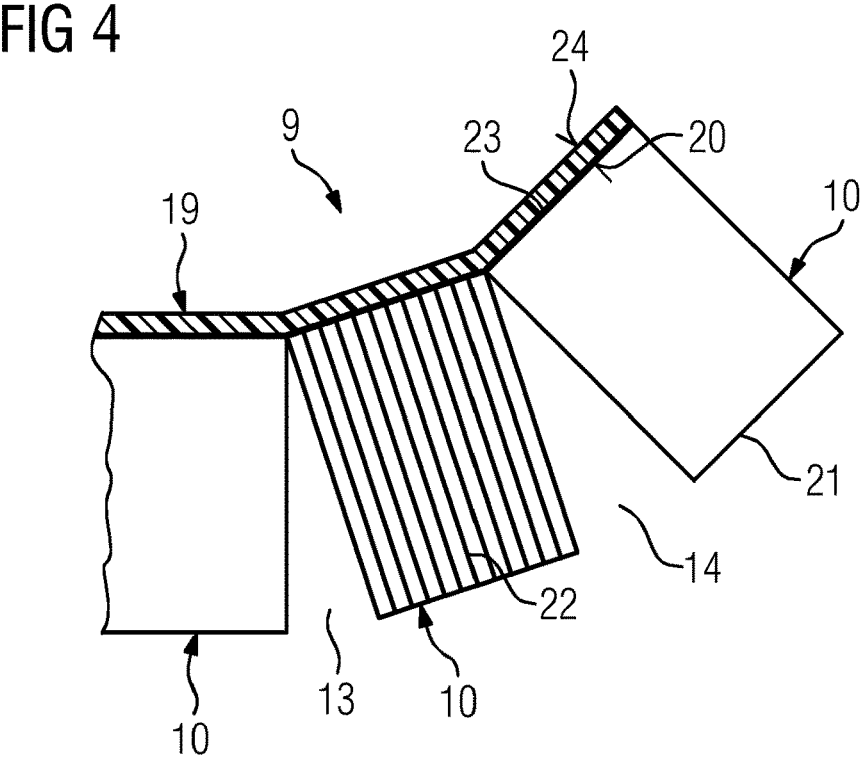
FIG. 4 shows a detail view of the flexible wood panel according to FIG. 3.

FIG. 4 shows a detail view of the flexible wood panel 9.

To improve the integrity and the handleability of the flexible wood panel 9, the flexible wood panel 9 is provided with a carrier layer in form of a polymer film 19. As can be seen in FIG. 4, each module 10 of the flexible wood panel 9 has a first surface 20 which faces the polymer film 19 and a second surface 21 which is averted from the polymer film 19. The first surface 20 and the second surface 21 run parallel to each other and are arranged in a distance from each other. The polymer film 19 is attached to the first surface 20. Wood fibers 22 of the modules 10 run perpendicular to the surfaces 20, 21.

The polymer film 19 can be perforated. That means the polymer film 19 can have a plurality of breakthroughs that are arranged in a uniform pattern. The polymer film 19 can also be smooth, i.e. not perforated. The polymer film 19 has adhesive properties. In particular, the polymer film 19 comprises an adhesive face 23, which is attached to the first surface 20 of the modules 10, and a non-adhesive face 24 which faces away from the first surface 20. The adhesive face 23 can comprise a glue. Alternatively, the material of the polymer film 19 can have intrinsic adhesive properties. That means, the material of the polymer film 19 itself works as adhesive. So, no additional adhesive needs to be applied to the adhesive face 23.

The adhesive face 23 can be applied to the wooden first surface 20 before cutting the flexible wood panel 9 into modules 10. An alternative production route is to extrude the polymer film 19 directly to the first surface 20 before cutting the flexible wood panel 9 into modules 10. The polymer film 19 can be a monolayered polymer film. In other words, the polymer film 19 has only one layer. Alternatively, the polymer film 19 can be a multilayered polymer film. That means, the polymer film 19 consists of a plurality of thin polymer sheets bonded together. These sheets can all be made of the same material or of different materials. The mechanical properties of the polymer film 19 can thus vary widely.

Figure 5:
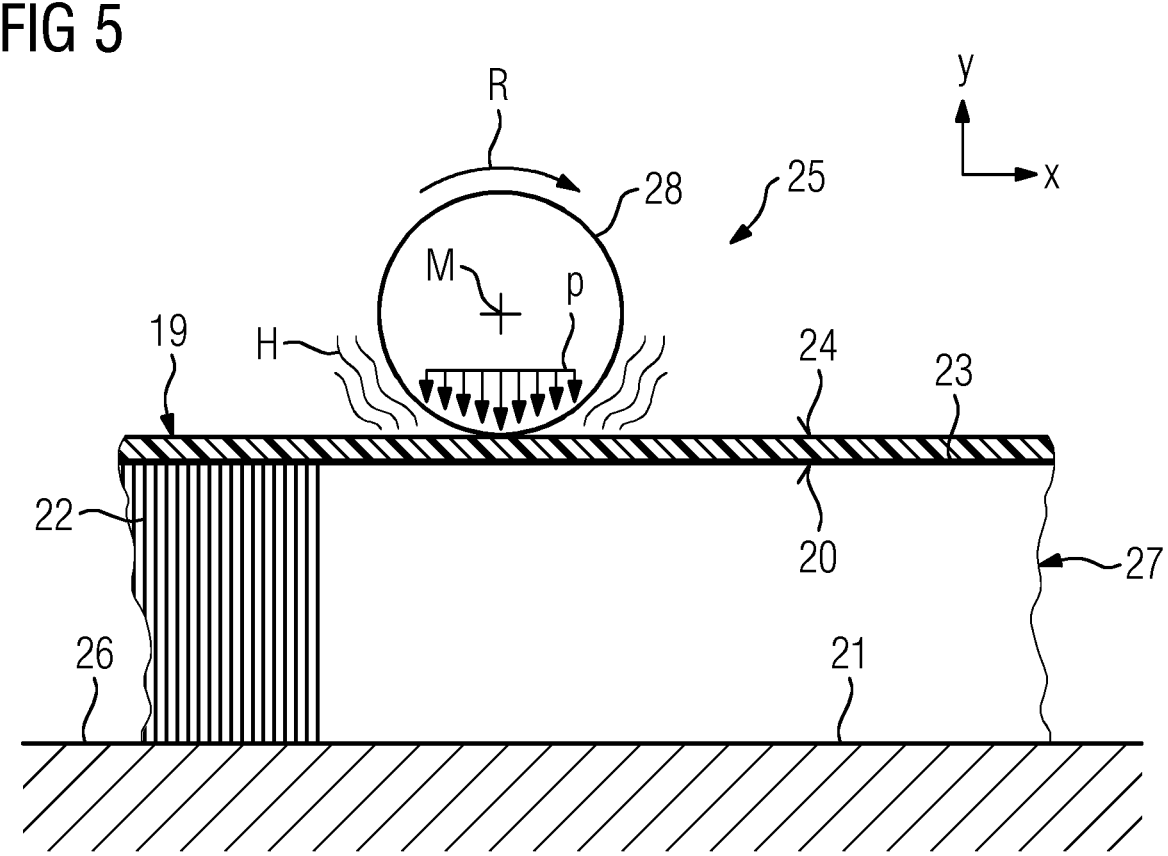
FIG. 5 shows a side view of an embodiment of a device for producing the flexible wood panel according to FIG. 3.

FIG. 5 shows a device 25 for producing the flexible wood panel 9.

The device 25 comprises a support 26 on which a rigid wood end grain panel 27, in particular a rigid balsa end grain panel, is placed. The rigid wood end grain panel 27 is not cut into modules 10 so far. The second surface 21 thereof is placed on the support 26 and the first surface 20 thereof faces away from the support 26. As mentioned before, wood fibers 22 run perpendicular to the surfaces 20, 21. The rigid wood end grain panel 27 can be named a rigid balsa wood panel.

The device 25 further comprises a roller 28. The roller 28 can be rotated in a rotation direction R around a rotation axis M. The rotation direction R can be oriented clockwise. The roller 28 can also be moved linearly along an x-direction. To generate pressure on the polymer film 19, the roller 28 can be pressed against the polymer film 19 in an y-direction.

To attach the polymer film 19 to the first surface 20 of the rigid wood end grain panel 27, the polymer film 19 is applied to the first surface 20. Subsequently or at the same time pressure p and/or heat H can be applied to the polymer film 19 to bond it to the first surface 20. The roller 28 can comprise a heating device for applying heat H to the polymer film 19. After bonding the polymer film 19 to the first surface 20, the rigid wood end grain panel 27 is cut (grid scoring) into modules 10 to get the flexible wood panel 9.

Figure 6:
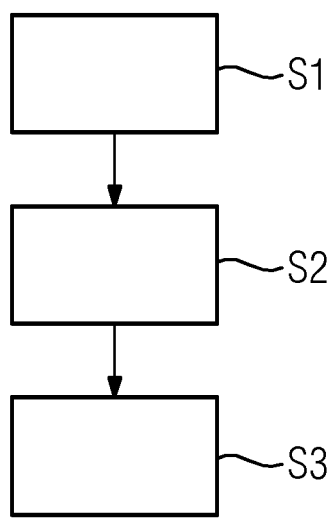
FIG. 6 shows a block diagram of an embodiment of a method for producing the flexible wood panel according to FIG. 3.

FIG. 6 shows a block diagram of an embodiment of a method for producing the flexible wood panel 19.

In a step 51 the rigid wood end grain panel 27 is provided. In a subsequent step S2 the polymer film 19 is attached to the first surface 20 of the rigid wood end grain panel 27. In a following step S3 the rigid wood end grain panel 27 is cut into a plurality of modules 10 to obtain the flexible wood panel 9. The cutting can be done either by a blade or a saw.

By applying the polymer film 19 instead of a glass fiber mesh the following advantages can be achieved. An adhesion area of the polymer film 19 is significantly larger than that of a glass fiber mesh. This in turn reduces the risk of modules 10 falling off during handling the flexible wood panel 9. A polymer film 19 with a high melting temperature relative to a maximum blade curing temperature can be selected in order to avoid curing process induced delaminations. Furthermore, due to the polymer film 19 attached to the first surface 20, a more uniform adhesion may be achieved compared to a currently used glass fiber mesh.

Although the present invention has been disclosed in the form of preferred embodiments and variations thereon, it will be understood that numerous additional modifications and variations could be made thereto without departing from the scope of the invention. For the sake of clarity, it is to be understood that the use of 'a' or 'an' throughout this application does not exclude a plurality, and 'comprising' does not exclude other steps or elements.

The invention claimed is:

1. A flexible balsa wood panel for a rotor blade of a wind turbine, comprising a plurality of balsa wood modules and a polymer film which is attached to a surface of each balsa wood module to connect the balsa wood modules together, wherein the polymer film includes a pressure-sensitive adhesive configured to adhere to the surface by heatless pressure applied to the pressure-sensitive adhesive.

2. The flexible balsa wood panel according to claim 1, wherein the polymer film is unreinforced.

3. The flexible balsa wood panel according to claim 1, wherein the polymer film is monolayered or multilayered.

4. The flexible balsa wood panel according to claim 1, wherein wood fibers of the balsa wood modules are arranged perpendicular to the surface of the balsa wood modules.

5. The flexible balsa wood panel according to claim 1, wherein the polymer film comprises an adhesive face which is attached to the surface of each balsa wood module and a non-adhesive face which faces away from the surface of each balsa wood module.

6. The flexible balsa wood panel according to claim 1, wherein the balsa wood modules are arranged in a matrix pattern.

7. The flexible balsa wood panel according to claim 1, wherein the balsa wood modules are rectangular or square-shaped.

8. The flexible balsa wood panel according to claim 1, wherein between the balsa wood modules are arranged first cuts and second cuts, and wherein the first cuts are arranged perpendicular to the second cuts.

9. A rotor blade for a wind turbine, comprising at least one flexible balsa wood panel according to claim 1.

10. A wind turbine, comprising at least one flexible balsa wood panel according to claim 1 or at least one rotor blade according to claim 9.

11. A method for producing a flexible balsa wood panel for a rotor blade of a wind turbine, comprising the steps of:
a) providing a rigid balsa wood panel,
b) attaching a polymer film to a surface of the rigid balsa wood panel, and
c) cutting the rigid balsa wood panel into a plurality of balsa wood modules to obtain the flexible balsa wood panel, wherein the polymer film includes a pressure-sensitive adhesive configured to adhere to the surface by heatless pressure applied to the pressure-sensitive adhesive.

12. The method according to claim 11, wherein in step b) the polymer film is attached to the surface of the rigid balsa wood panel by applying pressure.

13. The method according to claim 12, wherein the pressure is applied by a roller.

14. The method according to claim 11, wherein in step b) the polymer film is attached to the surface of the rigid balsa wood panel by directly extruding the polymer film onto the surface.

15. A wind turbine, comprising a rotor blade, wherein the rotor blade comprises at least one flexible balsa wood panel, wherein the flexible balsa wood panel includes a plurality of balsa wood modules and a polymer film which is attached to a surface of each balsa wood module to connect the balsa wood modules together, wherein the polymer film includes a pressure-sensitive adhesive configured to adhere to the surface by heatless pressure applied to the pressure-sensitive adhesive.

16. A flexible balsa wood panel for a rotor blade of a wind turbine, comprising a plurality of balsa wood modules and a polymer film which is attached to a surface of each balsa wood module to connect the balsa wood modules together, wherein the polymer film is fiberless and a polymer material of the polymer film has adhesive properties such that the polymer film is configured to adhere to the surface without any additional adhesive material.

17. A wind turbine comprising the flexible balsa wood panel for a rotor blade of claim 16.

* * * * *